United States Patent
Kadrnoska et al.

(10) Patent No.: US 6,832,873 B1
(45) Date of Patent: Dec. 21, 2004

(54) INSTALLATION VEHICLE

(76) Inventors: Helmut Kadrnoska, Doningasse 21, A-1220 Vienna (AT); Gerhard Reiss, Lainzerstrasse 157/6/1, A-1130 Vienna (AT); Johann Kübel, Steinabruck 35, A-3072 Kasten (AT)

( * ) Notice: Subject to any disclaimer, the term of this patent is extended or adjusted under 35 U.S.C. 154(b) by 0 days.

(21) Appl. No.: 10/382,605

(22) Filed: Mar. 6, 2003

Related U.S. Application Data (63) Continuation of application No. PCT/AT01/00280, filed on Sep. 6, 2001.

(30) Foreign Application Priority Data

Sep. 6, 2000 (AU) .......................................... 1521/2000

(51) Int. Cl.$^7$ ............................... F16L 7/00; E21D 9/12; B61B 13/10
(52) U.S. Cl. ................. 405/183.5; 405/418; 405/184.4; 254/134.3 R; 104/138.2; 173/35
(58) Field of Search ........................... 405/154.1, 183.5, 405/184, 184.1, 184.4, 138, 148, 146; 254/134.3 R, 134.4, 134.5; 104/138.2; 15/104.05, 104.061, 104.062; 173/34, 35, 25, 28; 138/37, 40, 89

(56) References Cited

U.S. PATENT DOCUMENTS

| | | | |
|---|---|---|---|
| 2,604,521 A | | 7/1952 | Boucher |
| 3,718,978 A | * | 3/1973 | Van Koevering et al. ............ 405/184.1 |
| 3,747,054 A | * | 7/1973 | Arvanetakis ............. 405/154.1 |
| 3,784,159 A | * | 1/1974 | Skattaman et al. ........... 254/45 |
| 3,811,290 A | | 5/1974 | Swoager |
| 3,813,126 A | * | 5/1974 | Rogne et al. ................. 299/33 |
| 3,957,124 A | * | 5/1976 | Desourdy .................... 173/28 |
| 3,967,686 A | * | 7/1976 | Fogelstrom ................. 173/184 |
| 4,006,359 A | * | 2/1977 | Sullins et al. ............. 104/138.2 |
| 4,026,118 A | * | 5/1977 | McCay, Jr. ................. 405/291 |
| 4,079,792 A | * | 3/1978 | Paul et al. ................... 173/189 |
| 4,098,353 A | | 7/1978 | Hood et al. |
| 4,586,571 A | * | 5/1986 | Rajakallio et al. .......... 173/193 |
| 4,654,702 A | * | 3/1987 | Tolino et al. ................. 348/84 |
| 4,682,926 A | | 7/1987 | Chambers et al. |
| 4,822,211 A | * | 4/1989 | Shinoda et al. .......... 405/183.5 |
| 6,145,444 A | * | 11/2000 | Wilkinson ............... 104/138.1 |
| 6,527,478 B2 | * | 3/2003 | Finzel et al. ............. 405/184.4 |

FOREIGN PATENT DOCUMENTS

| | | | |
|---|---|---|---|
| DE | 27 24 470 A1 | 12/1978 | |
| DE | 41 33 431 A1 | 4/1993 | |
| DE | 44 44 113 A1 | 6/1996 | |
| EP | 0 251 907 A2 | 1/1988 | |
| EP | 0 936 478 A1 | 8/1999 | |
| EP | 0 936 713 A1 | 8/1999 | |
| GB | 2 163 232 A | 2/1986 | |
| JP | 62171771 | * 7/1987 | |
| JP | 01218962 | * 9/1989 | .............. 104/138.2 |
| JP | 06 138 119 A | 5/1994 | |
| RU | 652 580 | 3/1979 | |
| WO | WO 99/04244 | 1/1999 | |
| WO | WO 99/08091 | 2/1999 | |
| WO | 0060211 | * 10/2000 | |
| WO | 0222974 | * 3/2002 | |

* cited by examiner

Primary Examiner—Jong-Suk (James) Lee
(74) Attorney, Agent, or Firm—Laurence A. Greenberg; Werner E. Stemer; Ralph E. Locher (57) ABSTRACT

In order to facilitate, and largely to automate, the installation of cable supports on a duct wall, an installation vehicle can be displaced in the duct. The vehicle has a basic body which contains a storage battery and on which are mounted wheels. At least one of the wheels is driven by an integrated wheel-hub motor. Carriers for supporting seats for the operators are provided on opposite end sides of the basic body and the individual subassemblies are controlled via a control box on the basic body. A platform, which can be raised by a hydraulic cylinder carries pivoting brackets. The pivoting brackets carry slides for percussion drills, which can be displaced into their operating position, in the direction of the duct wall, by way of a pneumatic spring and moved, counter to the force of the spring, into a rest position.

21 Claims, 8 Drawing Sheets

INSTALLATION VEHICLE

CROSS-REFERENCE TO RELATED APPLICATION

This application is a continuation, under 35 U.S.C. § 120, of copending international application No. PCT/AT01/00280, filed Sep. 6, 2001, which designated the United States.

BACKGROUND OF THE INVENTION

Field of the Invention

The invention relates to an installation vehicle which can be displaced in a duct, in particular in a sewer duct, and is intended for installing structural elements, preferably for fastening cable supports, on a duct wall, having a basic body on which are mounted wheels, arranged one behind the other in the direction of travel and rolling on the sewer bottom, and supporting rollers rolling on the side wall of the duct, at least one of the wheels being driven, and which is connected, preferably in a releasable manner, on an end side to a support which extends in the direction of travel and is intended for a seat.

DE 41 33 431 A has already disclosed a vehicle which can be displaced in a duct and has a basic body with a track system rolling on the sewer bottom and with supporting rollers rolling on the side walls of the duct. The basic body is connected in a releasable manner on the end side to a control platform which has a driver's seat and steering wheels at the front and also, in the region of the steering wheels, a console for optionally fastening, operating and inspection equipment.

Recently, use has been made of existing sewer ducts for the purpose of laying cables, in particular glass-fiber cables, which have the advantage that no excavation is necessary for this purpose. For laying the ,cables, cable supports are installed in the duct, to be precise preferably at the highest location of the duct profile, which has an egg-shaped cross section. These tubular cable supports, which are provided laterally with a slot for the introduction of the cables, are fastened on the duct wall, for which purpose corresponding bores have to be produced in this duct wall. The task of installing such cable supports manually is a laborious one, in particular also because it is not usually possible for the workers to stand upright in the duct profile and water is channeled in the sewer bottom.

It is also the case that such cable supports cannot be installed in a duct wall using the vehicle disclosed in DE 41 33 431 A, since this vehicle does not provide any means for fitting such cable supports in relatively high regions of the duct, although this is necessary in order to prevent the cable supports, and thus the cables located therein, from being loaded.

SUMMARY OF THE INVENTION

The object of the present invention is to provide an installation vehicle by means of which structural elements, preferably cable supports, can be fastened on the wall of a usually water-channeling duct quickly and in a manner which is straightforward for the operator to execute. In order to achieve this object, the invention proposes that the basic body is of trough-like design for accommodating a power source, and that a raisable and lowerable platform, on which installation units are supported, is fastened on the basic body. It is preferable for carriers which project in the direction of travel and are intended for supporting seats to be provided on two opposite end sides of the installation vehicle according to the invention.

The installation vehicle according to the invention allows the seated individuals to work comfortably even in the case of the duct cross section being of relatively low height, the installation units supported on the raisable and lowerable platform making largely automated work possible.

According to a preferred embodiment of the invention, the power source comprises a storage battery which is fastened in a releasable manner in the trough-like basic body and is preferably located in a water-tight box. For the purpose of controlling the individual subassemblies, in this case, there is provided on the trough-like basic body a control box which can be connected to the storage battery via cables and on which actuating elements, such as switches, buttons and/or levers, are arranged, it being possible for these to be easily operated by a seated operator.

In order to allow the position of the supporting rollers to be adapted to duct cross sections of different sizes, and thus reliably to prevent the installation vehicle from tilting, it is possible, according to the invention, for the supporting rollers to be mounted on changeable-length arms which are provided on the trough-like basic body.

For the purpose of guiding the raisable and lowerable platform, it is possible, according to a further feature of the invention, for upwardly projecting, preferably sleeve-like, guides to be provided on the trough-like basic body, it being possible for rods which project from the platform to be displaced in said guides.

In order to raise the platform, a preferably manually actuable hydraulic cylinder, which is supported on the trough-like basic body, is provided. This hydraulic cylinder is provided, for example, with a pump lever, the actuation of which causes the piston of the hydraulic cylinder to extend and raise the platform. Also provided in the hydraulic cylinder is a moving valve, the cylinder chamber being relieved of pressure when the latter is opened, as a result of which the platform is lowered.

According to the invention, it is possible for at least one pivoting bracket for the adjustable mounting of the installation units to be provided on the platform, with the result that these installation units can be oriented in the necessary manner.

In order that the installation units, having, for example, percussion drilling means, can be displaced in the direction of the duct wall on which the installation is to take place, linear guides, on which a slide for accommodating the tools, formed in particular by percussion drilling means, is guided such that it can be displaced and arrested, are provided on the pivoting bracket. This slide is provided with a manually releasable arresting means and is forced into its end position by a spring, preferably a pneumatic spring. If the arresting means is released, then, as a result of the action of the spring, the slide, and thus also the percussion drilling means or the like located on the slide, moves in the direction of the duct wall. In order to move the slide back into its rest position, in which it is fixed by the arresting means, a rack, which engages with a pinion which can be rotated by a crank, is provided on the slide, with the result that, by virtue of the pinion being rotated, the slide can be moved downward counter to the force of the spring.

The arresting means expediently has a triggering means which sets the percussion drilling means in operation, with the result that, during displacement of the slide in the direction of the duct wall, the percussion drilling means are automatically set in operation and drill fastener holes in the duct wall.

In order that the structural element which is to be fitted, for example the cable support, can also be moved into the installation position by means of the installation vehicle according to the invention, the installation vehicle, furthermore, has a mount which can be fixed by a catch, can be moved by a spring, once the catch has been released, and is intended for the structural element which is to be installed.

Electric wheel-hub motors which are integrated in the wheels are preferably provided for driving the latter, with the result that these wheels are driven directly.

In order to prevent the installation vehicle from executing an undesired movement in a sloping duct, it is possible for at least one of the wheels to have a manually actuable locking brake, which is preferably formed from a wedge which butts against the wheel circumference and which is supported on the trough-like basic body.

The invention is explained schematically, with reference to an exemplary embodiment, in the drawing.

DESCRIPTION OF THE PREFERRED EMBODIMENTS

The installation vehicle according to the invention is arranged in a duct 1 of egg-shaped cross section and serves for fastening cable supports 2 on the duct wall. In the drawing, the cable supports are arranged in the apex of the duct profile, but it is also possible for these cable supports to be fitted, by means of the installation carriage according to the invention, at some other point of the duct wall.

This installation vehicle has a trough-like basic body 3 in which a storage battery is fastened in a releasable manner, the storage battery being located in a water-tight box and forming the power source for supplying power to the individual sub-assemblies of the installation vehicle. By virtue of the storage battery being fastened in a releasable manner, it can easily be removed from the trough-like basic body 3 and charged outside the duct 1. The storage battery is connected, via cables having plug-in connections, to a control box 4 which is fastened on the trough-like basic body and has actuating elements, such as switches, buttons, levers or the like, for operating and controlling the individual sub-assemblies.

Figure 4:
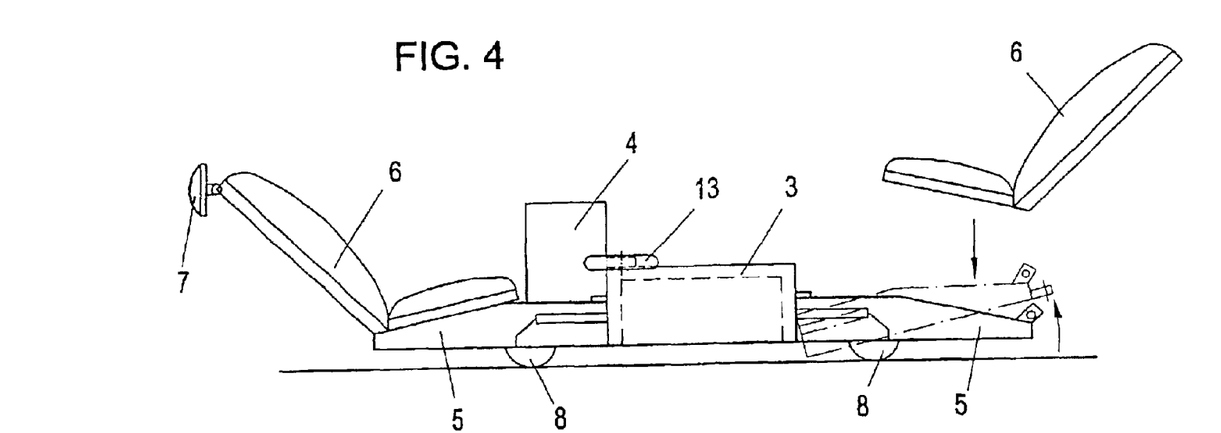
FIG. 4 shows the basic structure of the installation vehicle according to the invention with the wheels and with articulated carriers for supporting seats.

Provided on opposite end sides of the trough-like basic body 3 are carriers 5 which project in the direction of travel, which, as can be gathered from FIG. 4, are fitted in the trough-like basic body 3 by way of recesses and on which adjustable seats 6 for two operators of the installation vehicle are fastened in a releasable manner. The front seat 6, as seen in the direction of travel, has a spotlight 7, which is supplied with power by the storage battery, on its backrest.

Figure 5:
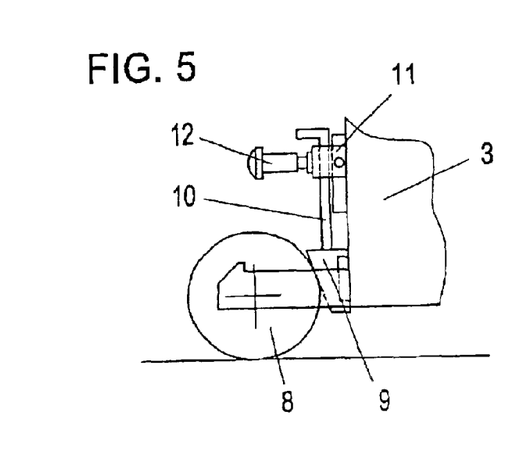
FIG. 5 shows a wheel brake.

The installation vehicle moves on wheels 8, which are mounted in wheel bearings provided on the two end sides of the trough-like basic body 3. At least one of the two wheels 8 is provided with an electric wheel-hub motor which is supplied with power by the storage battery, the power supply, and thus the movement of the installation vehicle, being controlled by a switch located on the control box 4. In order to prevent undesired advancement of the installation vehicle in a sloping duct, one of the wheels 8 is provided with a brake. As can be gathered from FIG. 5, this brake comprises a wedge 9 which is connected to a support 10 which is arranged in a displaceable manner in a guide 11 fastened on the trough-like basic body 3. The guide has a clamping device 12 which acts on the support 10 and by means of which the wedge 9 is retained in its top end position, in which the wheel 8 is not blocked. If the clamping device 12 is released, then the wedge 9 drops downward and comes into abutment against the wheel circumference, with the result that blocking of the wheel 8 takes place.

Figure 6:
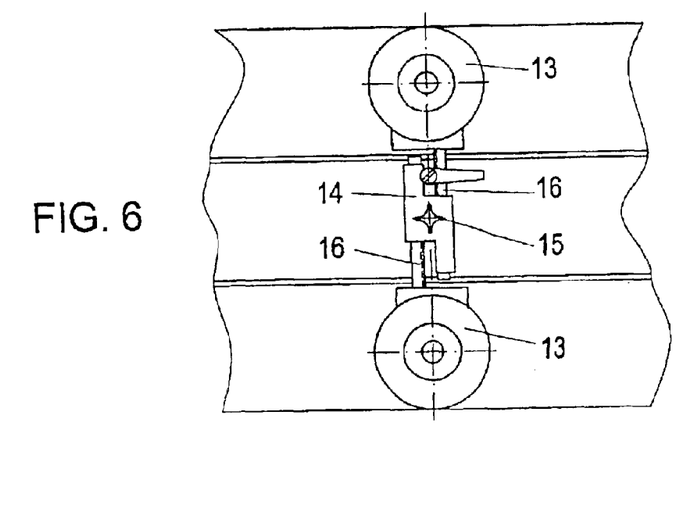
FIG. 6 shows the arrangement of lateral supporting rollers.

In order to prevent the installation vehicle from tilting laterally, supporting rollers 13 are provided, these being mounted on an arm 14, supported on the trough-like basic body 3, such that the length can be changed in a direction perpendicular to the direction of travel. For this purpose, as can be seen from FIG. 6, the arms 14 have racks 16 which can be adjusted synchronously be means of a hand lever 15 and on which the bearings for the supporting rollers 13 are located.

Sleeve-like guides 17 project upward from the trough-like basic body 3, rods 19 which project from a raisable and lowerable platform 18 being guided therein. For the purpose of raising the platform 18, use is made of a hydraulic cylinder 20, which is fastened on the trough-like basic body 3 and the piston 21 of which interacts with the raisable and lowerable platform 18. For the purpose of actuating the hydraulic cylinder, use is made of a pump lever 22, the manual actuation of which results in a build-up of pressure in the hydraulic cylinder 20, which causes the piston 21 to extend. In order to lower the piston 21 and thus the platform 18, a lowering valve is provided in the hydraulic cylinder 20, the pressure in the hydraulic cylinder 20 dropping when the said valve is opened.

Figure 12:
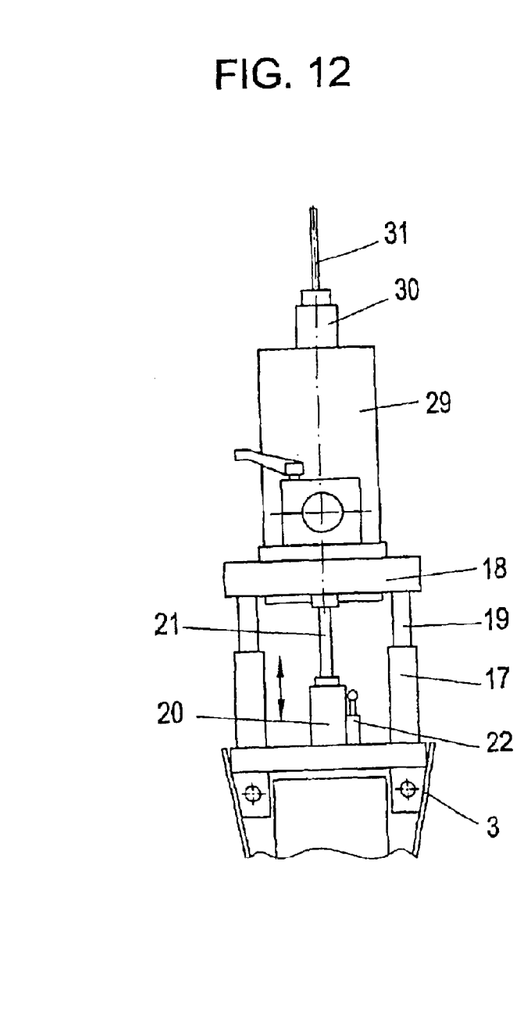
FIGS. 12 and 13 show a side view and a front view of the height-adjustment capability of the drill-bearing slides.
Figure 13:
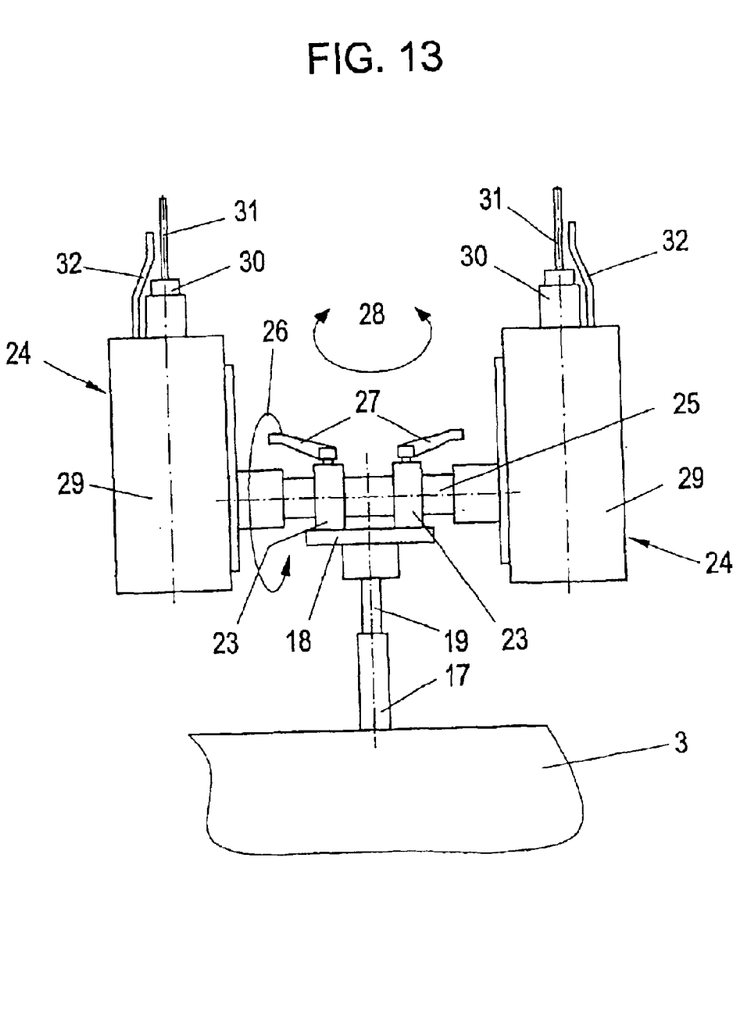

As can be gathered from FIGS. 12 and 13, pivoting brackets 23, which serve for mounting installation units 24, are provided on the platform 18. The stubs 25 projecting from said installation units 24 can be pivoted in the direction of the double arrow 26 in the pivoting brackets 23 and fixed in the set position by clamping levers 27. Pivoting in the direction of the double arrow 28 is also possible. This allows the position of the installation units to be adapted to the respective requirements.

As can be gathered from FIGS. 7 to 11, the installation units have a slide 29, which bears an arrangement for accommodating a percussion drill 30 with a drill bit 31. The drill-hole depth is determined in the usual manner by a drill-hole-depth stop 32. The slide 29 has a rack 33, which engages with a pinion 35 fastened on a shaft 34. The shaft 34 and thus the pinion 35 can be rotated by a crank 36. FIGS.

Figure 9:
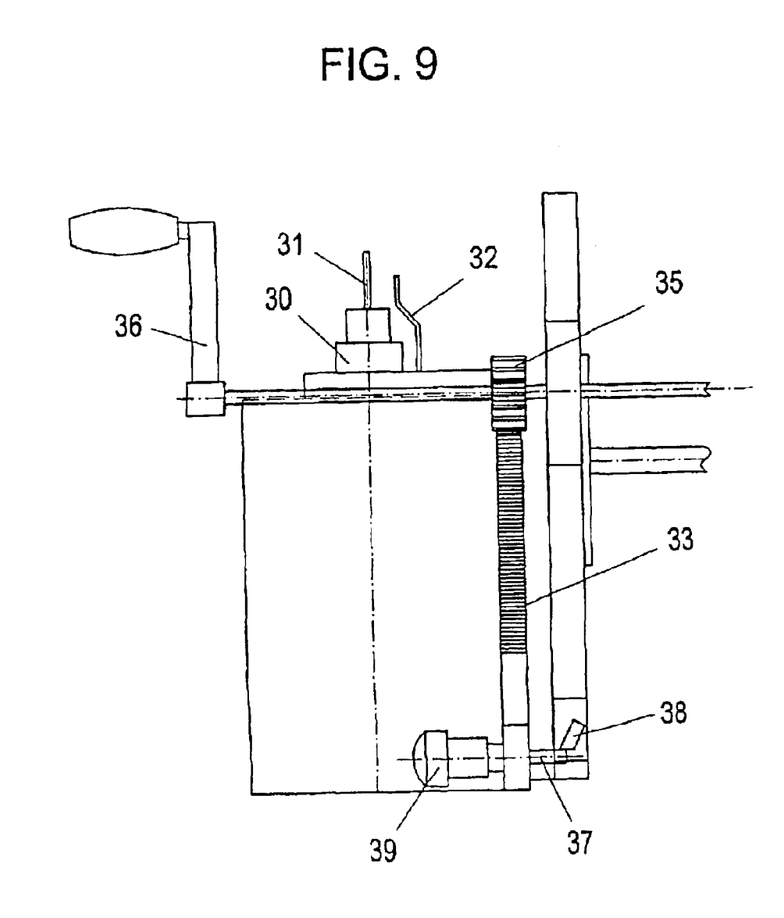
FIGS. 9 and 10 illustrate said slide in the bottom, locked position.
Figure 10:
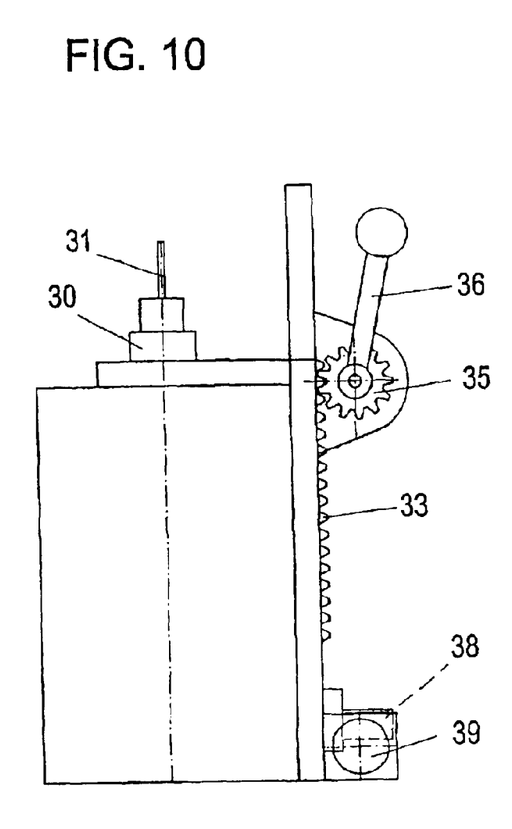

7 and 8 show the slide in a top end position, in which a drill hole in the duct wall is produced by means of the drill bit 31 of the percussion drill 30. Once the drill hole has been produced, actuation of the crank 36 moves the slide into its bottom end position, which is shown in FIGS. 9 and 10. The slide is retained in this position by a catch 37, which engages behind a protrusion 38. The catch 37 can be unlocked by virtue of an actuating knob 39 being pulled, whereupon the slide 29 is forced upward, by a pneumatic spring 40, into the position illustrated in FIGS. 7 and 8 (FIG. 11).

Figure 11:
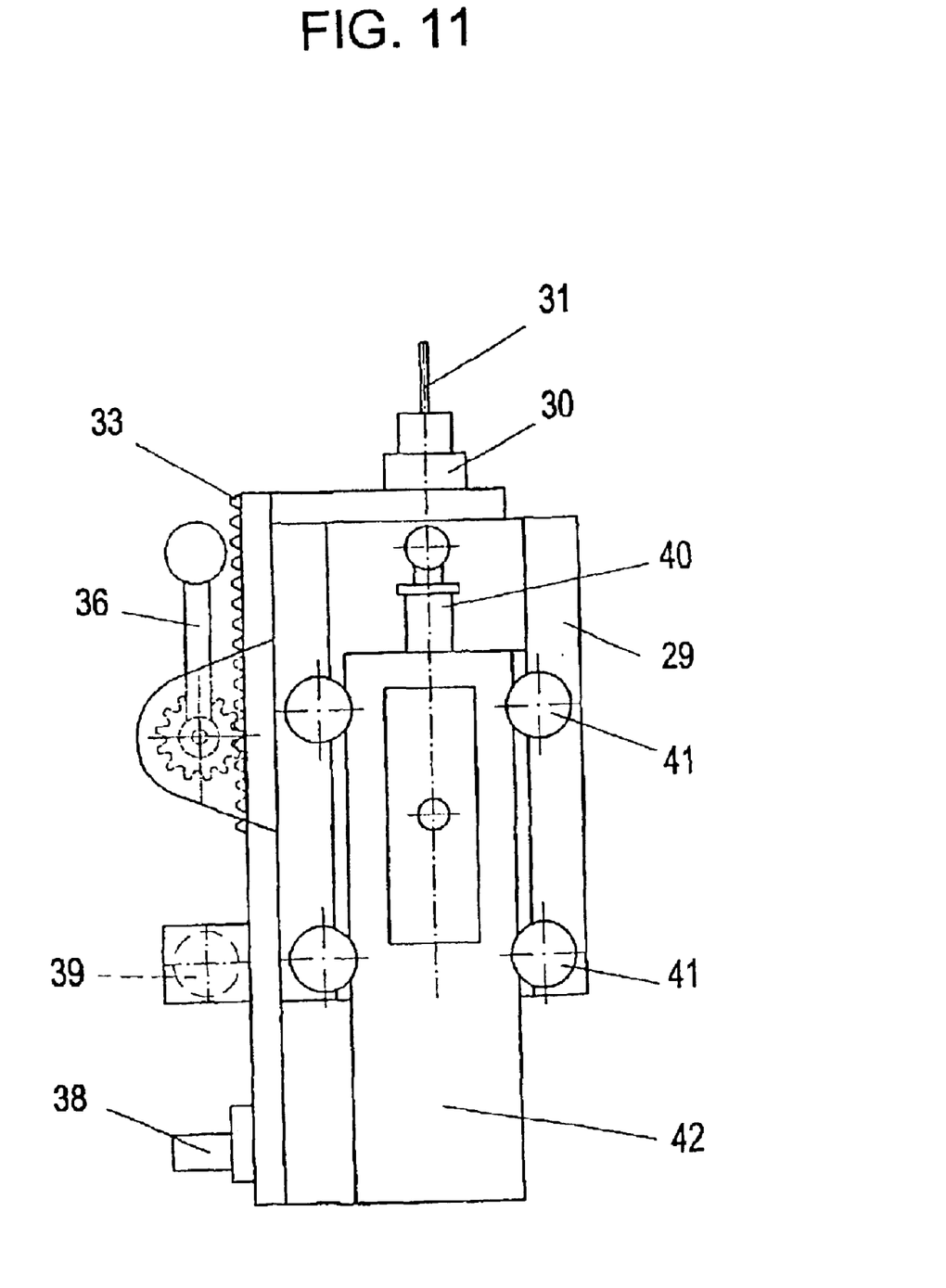
FIG. 11 shows the slide guide means.

As can be gathered from FIG. 11, the slide 29 is guided on a linear guide 42 by means of rollers 41.

Figure 14:
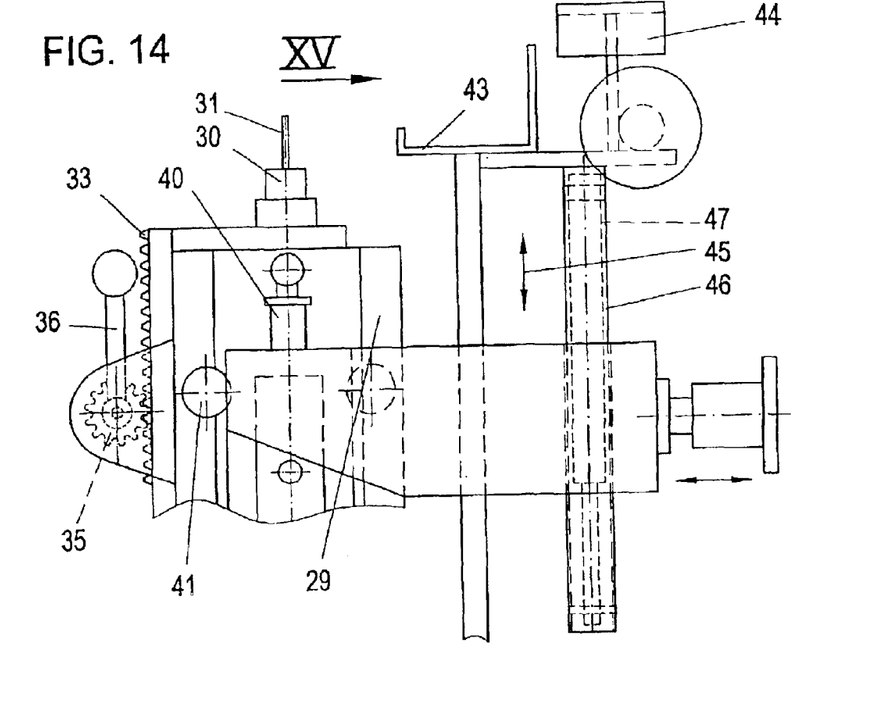
FIG. 14 illustrates the means for supporting the cable support which is to be installed.
Figure 15:
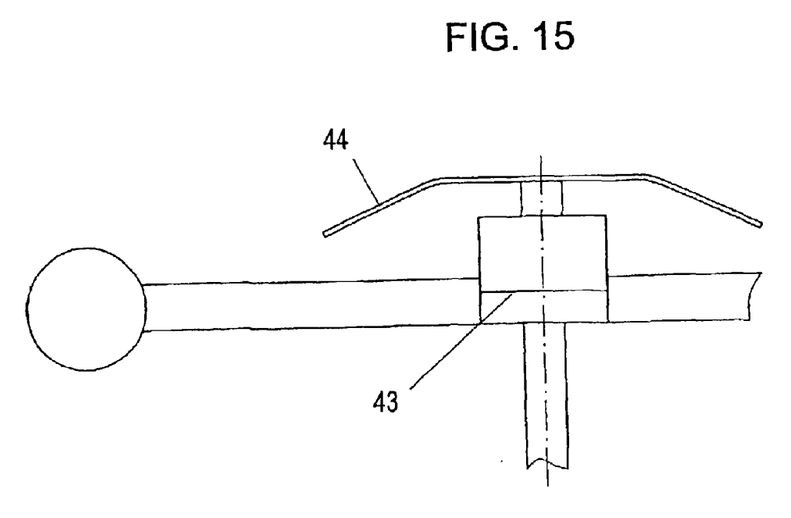
FIG. 15 shows a view in the direction of the arrow XV in FIG. 14.

As can be gathered from FIGS. 14 and 15, the installation unit 24 is also provided with a mount 43 for the cable support and with a pressure-exerting shoe 44, which can both be displaced in the direction of the double arrow 45. Provided for this purpose is a longitudinal guide 46, in which is arranged a spring 47 by means of which the mount 43, with a cable support 2 located therein, and the pressure-exerting shoe 44 for said cable support are forced against the duct wall. A spotlight 48 is provided for the purpose of illuminating the working area.

Figure 1:
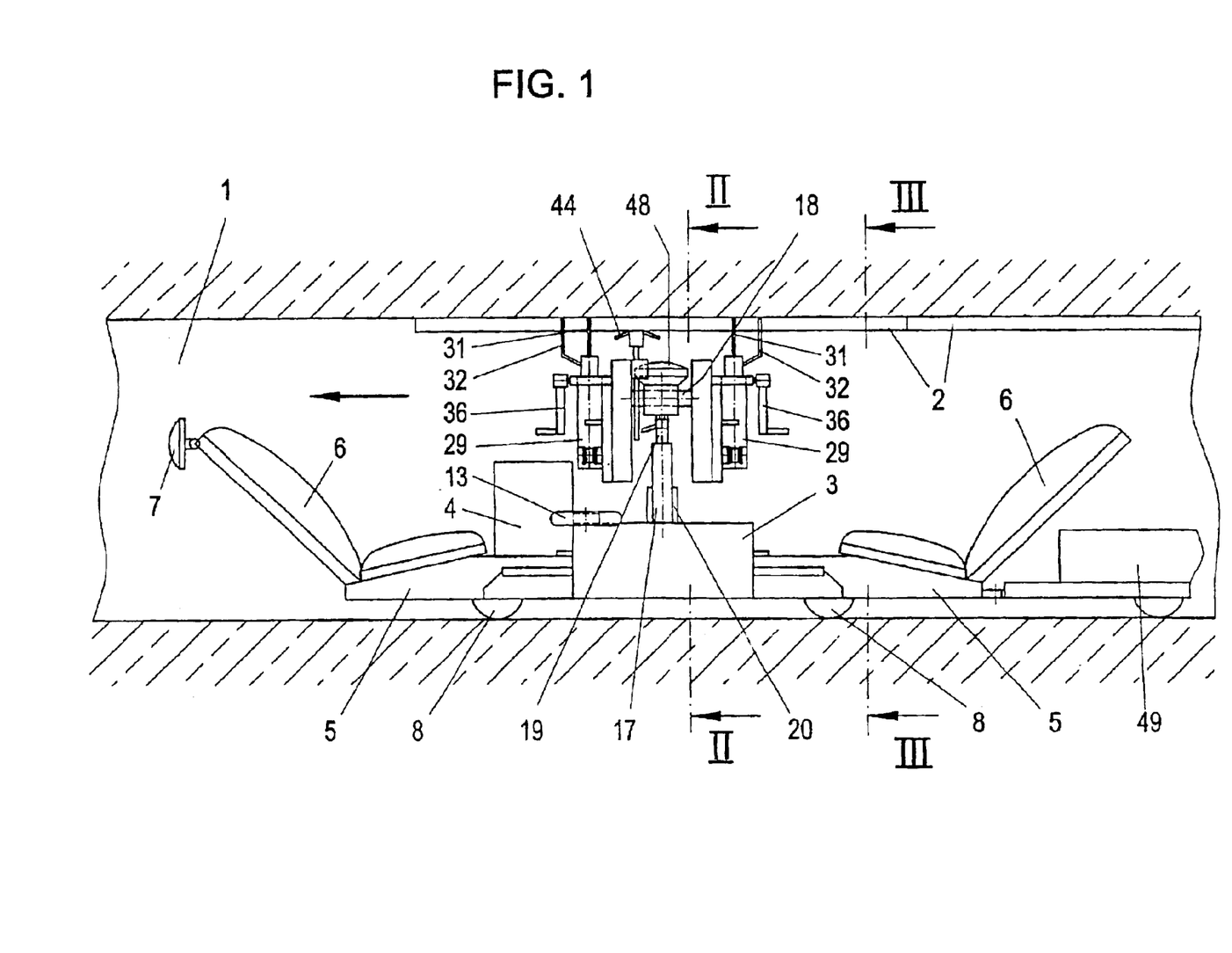
FIG. 1 shows a side view of the installation vehicle according to the invention arranged in a duct.
Figure 2:
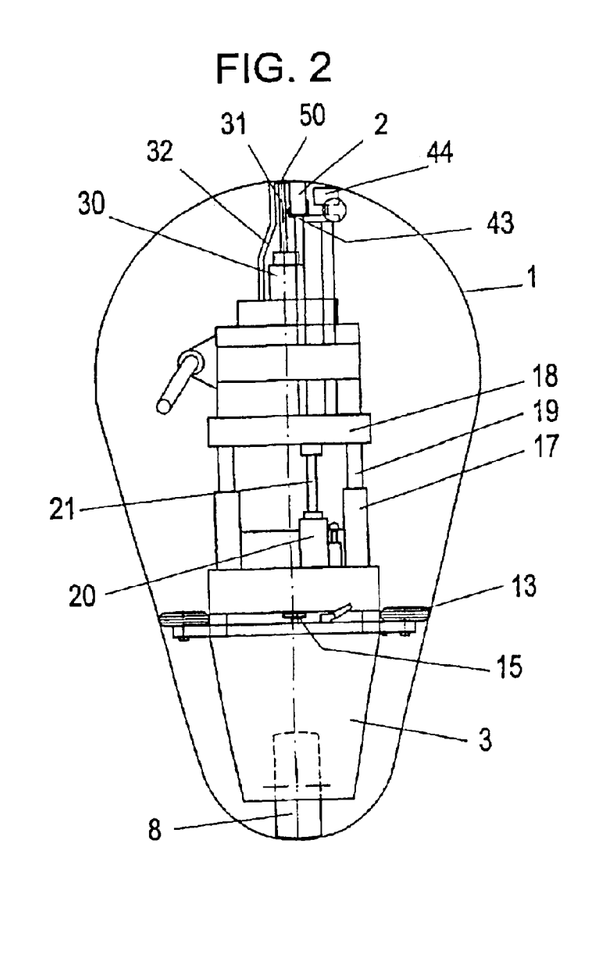
FIGS. 2 and 3 illustrate a section along lines II—II and III—III.
Figure 3:
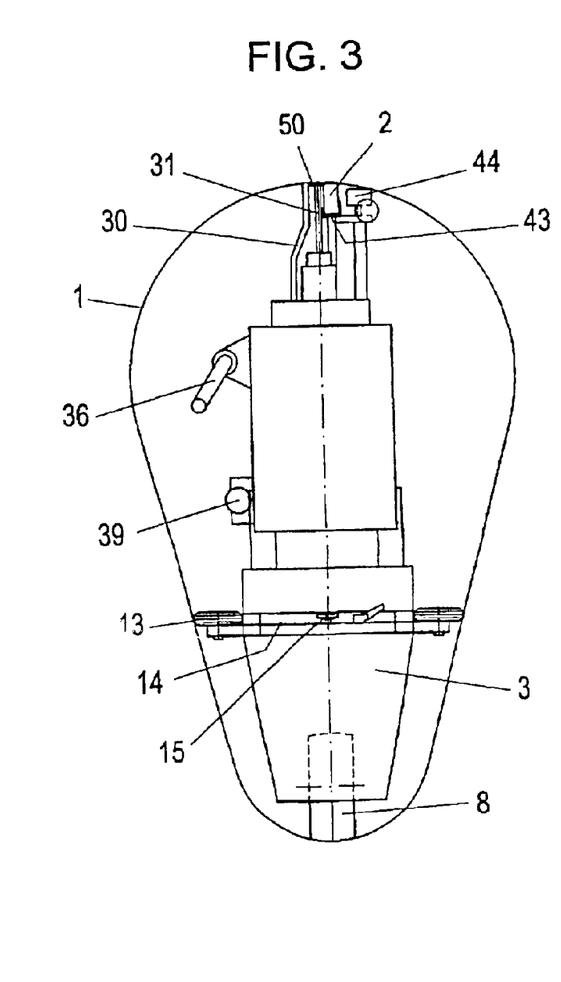

The procedure for installing a cable support 2 is as follows:

In the first instance, the installation vehicle is displaced into the position in which the cable support 2 is to be installed in the duct 1. Control takes place here, via the actuating elements provided in the control box 4, by the operator who is seated on the seat 6 alongside the control box 4. The slide 29 with the percussion drills 30 is located in the bottom position, which is illustrated in FIGS. 9 and 10. One of the cable supports, which are carried along on a trailer 49 (see FIG. 1), is then positioned in the mount 43 by the operator who is sitting in front of the trailer 49, and forced onto the duct wall by the pressure-exerting shoe 44. As can be gathered from FIGS. 2 and 3, the cable support 2 has a lateral protrusion 50, via which the fastening takes place.

Figure 7:
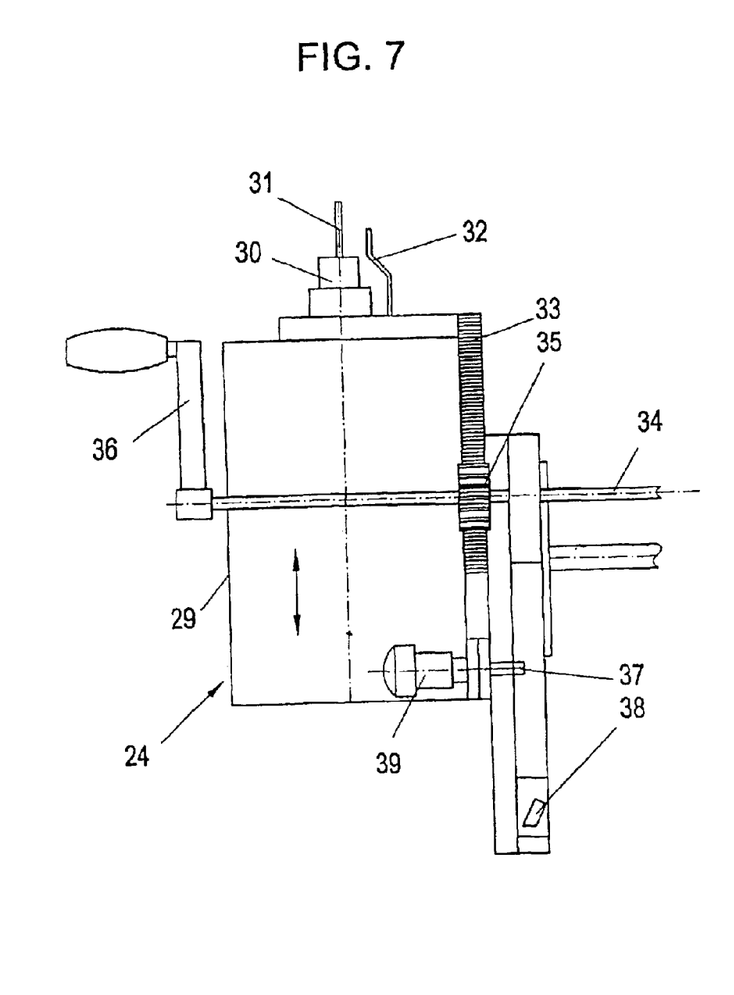
FIGS. 7 and 8 illustrate the drill-supporting slide in two views, which are perpendicular to one another in the top, operating position.
Figure 8:
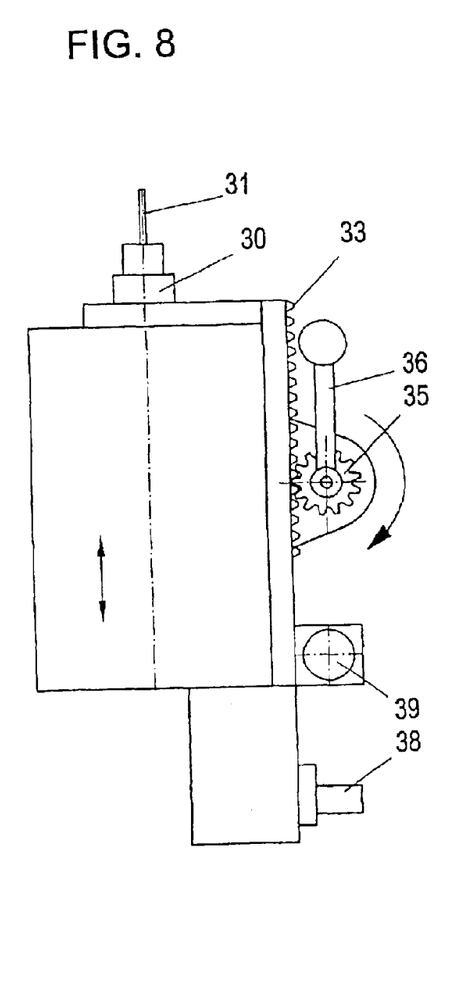

Once the cable support 2 has been positioned on the duct wall, the slide 29 is unlocked by virtue of the actuating knob 39 being pulled, with the result that said slide, with the percussion drills 30 fastened thereon, is forced upward by the pneumatic spring 40 and assumes the position which is shown in FIGS. 7 and 8. At the same time, the percussion drills 30 are set in operation by a means which is coupled to the movement of the slide 29 and acts on the actuating lever of the percussion drills. The drill bit 31 of the two percussion drills 30 drills holes in the duct wall through the protrusion 50 of the cable support 2, the depth of said holes being determined by the drill-hole-depth stop 32. Once the holes have been drilled, actuation of the crank 36 displaces the slide, via the pinion 35 interacting with the rack 33, downward into the end position which is illustrated in FIGS. 9 and 10, and in which the slide is fixed by the catch 37 interacting with the protrusion 38. The percussion drills 30 are also brought to a standstill in this case.

The cable support 2 is then fixed on the duct wall by fasteners being driven into the drill holes produced in this way. Once this work has been completed, the installation vehicle is displaced into a position in which a further cable support can be fastened, whereupon the process which has just been described is repeated.

We claim:

1. An installation vehicle for travel inside a duct having a bottom and a side wall, comprising:
    a basic body formed with a trough for accommodating a power source;
    a plurality of wheels mounted on said basic body offset behind one another in a direction of travel of the vehicle and supporting said basic body for rolling on the bottom of the duct, and supporting rollers for rolling on the side wall of the duct, said wheels including at least one driven wheel;
    a support connected to said basic body and configured to support thereon a seat;
    a selectively raisable and lowerable platform fastened on said basic body and supporting one or more installation units; and
    an hydraulic cylinder, supported on said basic body, for raising said platform.

2. The installation vehicle according to claim 1, wherein said support projects away from said basic body in the direction of travel of the vehicle and said support is releasably mounted to said basic body.

3. The installation vehicle according to claim 1 adapted to travel in a sewer duct, wherein said platform is configured for installing structural elements including cable supports on a duct wall.

4. The installation vehicle according to claim 1, wherein the power source comprises a storage battery releasably fastened in said trough of said basic body.

5. The installation vehicle according to claim 4, wherein said storage battery is disposed in a watertight box.

6. The installation vehicle according to claim 1, which comprises a control box disposed on said basic body, said control box being connected to said power source via cables and carrying actuating elements.

7. The installation vehicle according to claim 6, wherein said actuating elements include elements selected from the group consisting of switches, buttons, and levers.

8. The installation vehicle according to claim 1, which comprises extendible arms mounting said supporting rollers to said basic body.

9. The installation vehicle according to claim 1, wherein said platform is selectively raised and lowered along upwardly projecting guides disposed on said basic body.

10. The installation vehicle according to claim 1, wherein said cylinder is a manually actuable hydraulic cylinder.

11. The installation vehicle according to claim 1, wherein said installation unit includes a moveable mount configured to support the structural element to be installed, a catch for fixing said mount in a rest position, and a spring for moving said mount into an operating position.

12. The installation vehicle according to claim 1, which comprises at least one wheel-hub motor integrated in said at least one driven wheel.

13. The installation vehicle according to claim 1, wherein at least one of said wheels including a manually actuated locking brake.

14. The installation vehicle according to claim 13, wherein said brake is formed by a wedge disposed to butt against a wheel periphery and supported on said basic body.

15. An installation vehicle for travel inside a duct having a bottom and a side wall, comprising:
    a basic body formed with a trough for accommodating a power source;
    a plurality of wheels mounted on said basic body offset behind one another in a direction of travel of the vehicle and supporting said basic body for rolling on the bottom of the duct, and supporting rollers for rolling on the side wall of the duct, said wheels including at least one driven wheel;
    a support connected to said basic body and configured to support thereon a seat;

a selectively raisable and lowerable platform fastened on said basic body and supporting one or more installation units; and at least one pivotable bracket adjustably mounting said installation units on said platform.

16. An installation vehicle for travel inside a duct having a bottom and a side wall, comprising:

a basic body formed with a trough for accommodating a power source;

a plurality of wheels mounted on said basic body offset behind one another in a direction of travel of the vehicle and supporting said basic body for rolling on the bottom of the duct, and supporting rollers for rolling on the side wall of the duct, said wheels including at least one driven wheel;

a support connected to said basic body and configured to support thereon a seat;

a selectively raisable and lowerable platform fastened on said basic body and supporting one or more installation units;

a pivotable bracket connected to said said platform, and a linear guide disposed on said pivotable bracket, and a slide guided on said linear guide for accommodating at least one displaceable and arrestable tool on said pivotable bracket.

17. The installation vehicle according to claim 16, wherein said tool is a percussion drilling device.

18. The installation vehicle according to claim 16, which comprises a manually releasable arresting device operatively associated with said slide, and a spring for forcing said slide into an operating position thereof.

19. The installation vehicle according to claim 18, wherein said spring is a pneumatic spring.

20. The installation vehicle according to claim 18, wherein said arresting device is operatively associated with a triggering device for setting said percussion drilling device into operation.

21. The installation vehicle according to claim 16, which comprises a rack disposed on said slide, said rack meshing with a pinion adapted to be rotated by a crank.

* * * * *